Patented Dec. 14, 1948

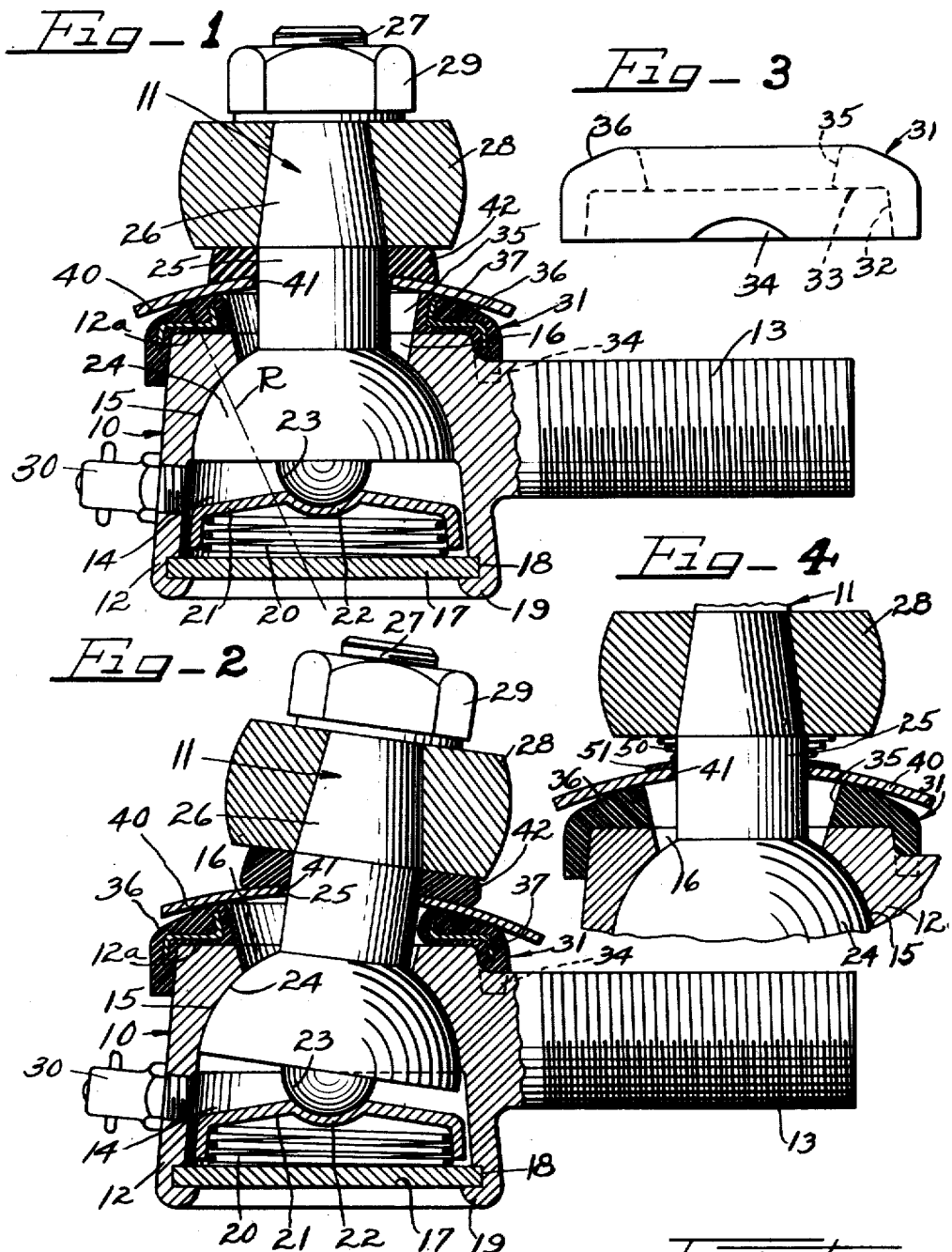

2,456,546

UNITED STATES PATENT OFFICE 2,456,546

TIE ROD JOINT SEAL

Anthony Venditty, Detroit, Mich., assignor to Thompson Products, Incorporated, Cleveland, Ohio, a corporation of Ohio Application January 1, 1944, Serial No. 516,740

1 Claim. (Cl. 287—90)

This invention relates to seals for joints such as universal joints which will prevent the entry of water and dirt into the joint housing while allowing excess lubricant to bleed out of the housing.

Specifically, the invention relates to tie rod joint grease seals capable of effectively sealing the joint socket while allowing superfluous grease which might be inadvertently pressured into the socket by high pressure grease guns to escape without damaging the seal.

The invention will hereinafter be specifically described as embodied in a tie rod joint, but it should be understood that the seals of this invention are useful in many installations and therefore the invention is not limited to tie rod joint usage.

In accordance with the invention a socket member receives, in snug fitting relation over one end thereof, a seal member having a face accommodating tilting movements. This seal member is hard enough to resist wear, but soft enough to be deformed under abnormal load. The seal member is preferably composed of synthetic rubber or other resilient plastic material. A joint member projects from the housing through the seal member and receives a metal disk therearound which is of arcuate contour to ride on the seal member carried by the housing. The disk contour is preferably flatter than the contour of the face of the seal member on the housing so that circle line contact between the disk and seal member is obtained until the seal member is deformed under pressure whereupon the line contact is increased to area contact.

The disk member is backed up by a resilient member such as a rubber bushing or a spring for urging the disk member against the housing-carried seal member. The disk member can rotate and tilt on the housing seal member and is sealed relative to the joint member around which it is mounted either by the rubber bushing or by a spring-urged seal member. It also has sealing contact with the housing-carried seal member.

In a modification of the invention the housing-carried seal member can be rigidified with a metal insert which prevents excessive wear of the plastic material when high pressures are encountered.

It is, then, an object of the invention to provide a dust cover for tie rod joints which effectively seals against the entry of water and dirt while allowing superfluous grease in the joint housing to escape without damaging the seal.

A further object of the invention is to provide a tie rod joint grease seal which effectively seals tie rod joint sockets from water and dirt while allowing excess grease to bleed from the socket without destruction of the seal.

A still further object of the invention is to provide a dust cover and grease seal for universal joints wherein a metal member rides on a resilient plastic material member and deforms the resilient plastic material member when subjected to increased load.

A specific object of the invention is to provide a tie rod joint seal wherein the joint housing is provided with a molded resilient plastic material seal part snugly engaging one end thereof and wherein the joint stud is equipped with a spherical metal stamping piece for riding on the molded seal part.

A further specific object of the invention is to increase the wear resistance of molded plastic seal parts by incorporating a metal insert therein.

Another object of the invention is to provide a joint accommodating universal movement wherein seal parts normally have line engagement with each other but are brought into area engagement with each under abnormal conditions.

Other and further objects of the invention will be apparent to those skilled in the art from the following detailed description of the annexed sheet of drawings which, by way of preferred example, illustrates two embodiments of the invention.

On the drawings:

Figure 1 is a side elevational view, with parts in vertical cross-section, of a tie rod joint equipped with a seal in accordance with this invention.

Figure 2 is a view similar to Figure 1 but illustrating the joint and seal in tilted position.

Figure 3 is a side elevational view of the resilient deformable seal part of the seal of this invention.

Figure 4 is a fragmentary vertical cross-sectional view, with parts in elevation, of a tie rod joint equipped with a modified seal construction of this invention.

As shown on the drawings:

In Figures 1 and 2 the reference numeral 10 designates generally a tie rod joint housing or socket while the reference numeral 11 designates generally a stud tiltable and rotatable in the housing or socket 10.

The housing 10 has a generally cylindrical end portion 12 which is somewhat tapered as shown, together with a laterally extending externally threaded stem portion 13. The stem 13 is adapted to be threaded into the end of a tie rod (not shown). The cylindrical end 12 of the housing 10 provides a socket chamber 14 with a fragmental spherical bearing wall 15 at one end thereof converging to an opening 16 in the top part of the housing.

The bottom of the chamber 14 is closed by means of a closure disk 17 which is seated in a counterbore 18 and retained in the counterbore by means of a spun-over portion 19 of the housing. A coil spring 20 is bottomed on the closure disk 17 and acts on a retainer cup 21 having a top wall with a rounded depression 22 therein. The spring urges the retainer member 21 upwardly in the chamber 14 toward the opening 16.

The stud 11 has a rounded button-like end 23 seated in the rounded depression 22 of the retainer cup 21. The stud 11 also has a fragmental spherical head portion 24 tiltable and rotatable on the bearing wall 15 of the housing. A cylindrical shank portion 25 of the stud projects freely through the opening 16 of the housing and a frusto-conical shank portion 26 has the base thereof at the upper end of the cylindrical portion 25 and the apex thereof at the base of an externally threaded cylindrical portion 27.

A steering arm knuckle or connecting link has an eye end 28 seated on the tapered portion 26 of the stud 11 and held in clamped relation thereon by means of a nut 29 threaded on the portion 27 of the stud.

Lubricant is introduced into the socket chamber 14 through a fitting 30 threaded into the portion 12 of the housing 10.

The top end of the housing portion 12 has a flat end face 12a surrounding the opening 16 and, in accordance with this invention, a relatively hard but resiliently deformable sealing member 31 has a recess 32 bottomed by an annular shoulder 33 receiving the top portion of the housing part 12 with the end face 12a of the housing part bottomed on the shoulder 33 and with the side wall of the recess snugly engaging the side wall of the housing.

As shown in Figure 3 the seal part 31 has a cut-out portion 34 in the side wall thereof to receive the stem 13 of the socket 10 as indicated in Figures 1 and 2 in dotted lines.

The seal member 31 has a diverging central aperture 35 therethrough adapted to continue the opening 16 of the housing part 12 and freely receive the cylindrical portion 25 of the stud 11.

The seal member 31 has a segmental spherical top wall 36 struck from a radius R centered on the axial center of the housing part 12 as shown in Figure 1. This face 36 accommodates tilting or rocking movements and is also deformable under abnormal pressures.

The seal member 31 can be conveniently molded from synthetic plastic material, such as synthetic rubber, or other grease-resisting resilient plastic, and, to increase its wearability, a stamped metal insert 37 is preferably provided in the molded piece. As shown in Figures 1 and 2, this insert 37 has an upturned flange rigidifying the hole 35 defining portion of the seal piece together with a downturned flange rigidifying the recess 32 defining portion of the piece. The insert 37 is completely covered with deformable plastic material however.

The piece 31 can be formed by molding the plastic material around the stamping 37.

As shown in Figures 1 and 2, a metal washer 40 of segmental spherical contour has a central opening 41 therethrough freely receiving the cylindrical portion 25 of the stud. The washer 40 is struck from a radius longer than the radius R so that the concave under face of the washer only has a circle line contact with the seal face 36 under normal conditions.

A deformable bushing 42 such as synthetic rubber or the like is sealingly disposed around the cylindrical portion 25 of the stud and held under compression between the eye member 28 and the washer 40 to urge the washer into sealing contact with the surface 36 of the seal piece 31. At the same time the bushing 42 seals the hole 41 in the washer to prevent leakage through this hole.

As indicated in Figure 1, the washer 40 will normally have a circle line contact with the face 36 of the seal piece 31 close to the hole 35 in the seal piece. However, when the stud 11 and eye 28 thereon is tilted, the rubber bushing 42 is loaded on one side more than on the other side thereof and exerts more pressure on this highly loaded side against the washer 40 causing the washer to deform the sealing face 36 of the seal piece 31 into full conformity with the arcuate under face of the washer and thereby change the line contact into an area contact between the washer and seal piece 31.

As also indicated in Figure 2, the insert 37 holds the seal piece 31 snugly on the housing part 12 even when it is deformed by the washer 40 being pushed thereover in the direction of tilt.

The washer 40 has a flatter contour than the face 36 of the seal piece 31 so that greater tilting angles of the stud can be used without striking the washer on the stem 13. At the same time the washer has full circle line contact with the seal piece 31 which is sufficient to seal the socket chamber 14.

In the event that the chamber 14 is filled with an excessive amount of grease, this grease can work up between the stud head 24 and bearing wall 15 through the opening 16 and hole 35 of the seal piece 31 where it will exert pressure on the washer 40 tending to raise the washer off of the face 36 whenever the grease pressure exceeds the pressure exerted on the washer by the bushing 42. As a result excess grease can bleed out of the housing without damaging the seal. Of course, as soon as pressure on the outer face of the washer exceeds the pressure inside of the housing, the washer will have sealing contact with the seal piece 31.

In the embodiment shown in Figure 4 of the drawings, parts have been marked with the same reference numerals, but the seal part 31 is not equipped with the metal insert 37 of Figures 1 and 2, and is simply a one-piece molded plastic ring seated on the top of the housing part 12 and providing the rocking surface 36 for the metal seal washer 40.

The rubber bushing 42 of Figures 1 and 2, however, has been replaced with a coiled spring 50 and a thin, flexible washer 51 composed of leather, synthetic plastic material, or the like. The washer 51 snugly engages the cylindrical part 25 of the stud 11 and seals the hole 41 in the washer 40. The spring 50 acts through the washer 51 on the washer 40 for maintaining sealing engagement between the concave under face of the washer 40 and the convex rocking face 36 of the seal piece 31.

The seal of Figure 4 operates in the same manner as the seal of Figures 1 and 2 but the spring 50 can compress to accommodate relative tilting between the washer 40 and eye piece 28 so that the washer 40 does not present a greatly increased pressure load on the seal piece 31 such as is illustrated in Figure 2. The washer 40 thereby maintains more of a circle line contact with the seal piece 31 of Figure 4 during all tilting positions of the stud but nevertheless the piece 31 is deformable under abnormal load to have area contact with the washer 40. Since the seal piece 31 of Figure 4 is not subjected to the greater wearing loads as when the washer 40 is backed by a solid bushing such as 42 illustrated in Figure 2, the metal insert need not be used. Of course, if desired, the seal piece 31 of Figure 4 could be used in the embodiment of Figure 1 and 2, while the seal piece 31 of the embodiment of Figures 1 and 2 could be used in the embodiment of Figure 4.

From the above descriptions it will be understood that the invention now provides a dust cap and grease seal for tie rod joints which is simple, inexpensive, and at the same time effective to exclude dirt and water from the joint socket while not being damaged by excess grease pressure in the socket. The relatively moving seal parts are normally in line contact which closely approaches area contact and actually do have area contact under abnormal loads because at least one of the seal parts is resiliently deformable.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A universal joint seal comprising a deformable plastic member providing a deformable arcuate rocking surface on a joint part, a metal seal part having an arcuate rocking surface of greater radius than said deformable arcuate rocking surface and riding thereon, and resilient means urging said rocking surfaces into sealing engagement.

ANTHONY VENDITTY.

REFERENCES CITED

The following references are of record in the file of this patent:

UNITED STATES PATENTS

| Number | Name | Date |
|---|---|---|
| 1,902,667 | Sanders | Mar. 21, 1933 |
| 2,083,718 | Kull et al. | June 15, 1937 |
| 2,111,200 | Amourelle | Mar. 15, 1938 |
| 2,157,401 | Craver | May 9, 1939 |
| 2,206,972 | Niles | July 9, 1940 |
| 2,272,650 | Von Veh | Feb. 10, 1942 |
| 2,301,346 | Venditty | Nov. 10, 1942 |
| 2,364,176 | Waldron | Dec. 5, 1944 |

FOREIGN PATENTS

| Number | Country | Date |
|---|---|---|
| 121,867 | Great Britain | Jan. 9, 1919 |
| 540,372 | Great Britain | Oct. 15, 1941 |